US008866790B2

(12) United States Patent  
Simmons et al.

(10) Patent No.: US 8,866,790 B2  
(45) Date of Patent: Oct. 21, 2014

(54) MULTI-TOUCH TRACKING

(75) Inventors: Martin Simmons, Southampton (GB); Daniel Pickett, Southampton (GB)

(73) Assignee: Atmel Corporation, San Jose, CA (US)

( * ) Notice: Subject to any disclaimer, the term of this patent is extended or adjusted under 35 U.S.C. 154(b) by 1205 days.

(21) Appl. No.: 12/255,620

(22) Filed: Oct. 21, 2008

(65) Prior Publication Data

US 2010/0097342 A1    Apr. 22, 2010

(51) Int. Cl.
G06F 3/045 (2006.01)
G06F 3/044 (2006.01)
G06F 3/0488 (2013.01)
G06F 3/041 (2006.01)

(52) U.S. Cl.
CPC ............ *G06F 3/044* (2013.01); *G06F 3/04883* (2013.01); *G06F 2203/04808* (2013.01); *G06F 3/0416* (2013.01)
USPC .......................................... 345/174; 345/173

(58) Field of Classification Search
USPC .................................. 345/173, 174; 715/702
See application file for complete search history.

(56) References Cited

U.S. PATENT DOCUMENTS

| 5,463,388 A | 10/1995 | Boie et al. |
| 5,825,352 A | 10/1998 | Bisset et al. |
| 6,452,514 B1 | 9/2002 | Philipp |
| 6,888,536 B2 | 5/2005 | Westerman et al. |
| 7,663,607 B2 | 2/2010 | Hotelling |
| 7,875,814 B2 | 1/2011 | Chen |
| 7,920,129 B2 | 4/2011 | Hotelling |
| 8,031,094 B2 | 10/2011 | Hotelling |
| 8,031,174 B2 | 10/2011 | Hamblin |
| 8,040,326 B2 | 10/2011 | Hotelling |
| 8,049,732 B2 | 11/2011 | Hotelling |
| 8,179,381 B2 | 5/2012 | Frey |
| 2006/0097991 A1 | 5/2006 | Hotelling |

(Continued)

FOREIGN PATENT DOCUMENTS

| CN | 1969254 A | 5/2007 | ............. G06F 3/033 |
| WO | 00/44018 A1 | 7/2000 | |
| WO | WO 2012/129247 | 9/2012 | |

OTHER PUBLICATIONS

U.S. Appl. No. 61/454,936, filed Mar. 21, 2011, Myers.

(Continued)

*Primary Examiner* — Amare Mengistu  
*Assistant Examiner* — Joseph G Rodriguez  
(74) *Attorney, Agent, or Firm* — Baker Botts LLP

(57) ABSTRACT

A method of tracking multiple touches over time on a touch sensor, for example a capacitive touch screen. The method analyzes first and second touch data sets from adjacent first and second time frames. First, the touch data sets are analyzed to determine the closest touch in the second time frame to each of the touches in the first time frame, and calculating the separation between each such pair of touches. Then, starting with the pair of touches having the smallest separation, each pair is validated until a pairing is attempted between touches for which the touch in the second time frame has already been paired. At this point, the as-yet unpaired touches from the first and second touch data sets are re-processed by re-applying the computations but only including the as-yet unpaired touches. This re-processing is iterated until no further pairings need to be made. The method avoids complex algebra and floating point operations, and has little memory requirement. As such it is ideally suited to implementation on a microcontroller.

17 Claims, 5 Drawing Sheets

(56) References Cited

U.S. PATENT DOCUMENTS

| | | |
|---|---|---|
| 2006/0250377 A1 | 11/2006 | Zadesky et al. |
| 2007/0109279 A1 | 5/2007 | Sigona .......................... 345/177 |
| 2007/0152979 A1 | 7/2007 | Jobs et al. |
| 2007/0152984 A1 | 7/2007 | Ording et al. |
| 2007/0177804 A1 | 8/2007 | Elias et al. |
| 2007/0257890 A1 | 11/2007 | Hotelling et al. |
| 2007/0268269 A1* | 11/2007 | Chang et al. ................. 345/173 |
| 2008/0062148 A1* | 3/2008 | Hotelling et al. ............. 345/174 |
| 2008/0165141 A1 | 7/2008 | Christie |
| 2008/0246496 A1 | 10/2008 | Hristov et al. |
| 2009/0021489 A1* | 1/2009 | Westerman et al. .......... 345/173 |
| 2009/0315854 A1 | 12/2009 | Matsuo |
| 2010/0083109 A1* | 4/2010 | Tse et al. ..................... 715/702 |
| 2012/0242588 A1 | 9/2012 | Myers |
| 2012/0242592 A1 | 9/2012 | Rothkopf |
| 2012/0243151 A1 | 9/2012 | Lynch |
| 2012/0243719 A1 | 9/2012 | Franklin |

OTHER PUBLICATIONS

U.S. Appl. No. 61/454,950, filed Mar. 21, 2011, Lynch.
U.S. Appl. No. 61/454,894, filed Mar. 21, 2011, Rothkopf.
State Intellectual Property Office (SIPO) of the People's Republic of China, Chinese First Office Action and English Translation of Text, Chinese Patent Appl. No. 200980146518.3, Ref: 2013061700985110; Date of Issuance: Jun. 20, 2013; Reported to Baker Botts by Foreign Associate: Sep. 18, 2013.

\* cited by examiner

MULTI-TOUCH TRACKING

BACKGROUND OF THE INVENTION

The invention relates to tracking multiple simultaneous touches adjacent a two-dimensional (2D) touch panel.

2D touch panels based on capacitive sensing are in widespread use in a variety of applications. Typically, the 2D touch panels are actuated by a finger, either in direct contact, or through proximity (i.e. without contact). Sometimes a stylus is used instead. For example, 2D touch panels are used as touchpads of laptop computers, in control panels of domestic appliances such as microwave ovens and cooktops, and as overlays to displays on hand held devices, such as mobile telephones. Many other applications are known in the art.

For some applications, a 2D touch panel is designed to be able to detect two or more touches simultaneously, this capability often being referred to as "multitouch" in the art. For example, as is well known, computers are conventionally controlled by a mouse, which combines two or three sensors, namely the tracking ball for the cursor motion and two buttons for selection of icons at the cursor position. A mouse thus combines cursor motion through movement of the mouse device, and two finger actions for actuating the left and right mouse buttons. In a laptop, the mouse functions are provided by a touchpad with adjacent buttons. A user moves the cursor through sliding one finger over the touchpad area, and selects icons and so forth by actuation of the two "mouse" buttons with his or her thumb, or one or two other fingers.

Another example of a device that requires multiple simultaneous finger inputs is a hand-held games console, where typically the left and right thumbs are used to control different functions of the device, or jointly to control the same function. Controllers for in-flight entertainment systems often have a similar mode of operation.

More recently 2D touch panels have been programmed to recognize multitouch gestures such as pinch of a thumb and forefinger. A more classical example would be a music keyboard where playing a chord could be referred to as a multitouch gesture using modern industry parlance.

Typically, touches adjacent a touch panel are obtained, i.e. polled or sampled, over a series of time-frames separated by a time interval which may be fixed or variable. At every time interval that the touch panel is sampled, a set of co-ordinates for each detected touch are obtained.

Prior art methods for detecting multiple touches simultaneously are for example discussed in U.S. Pat. No. 5,825,352 [1], U.S. Pat. No. 6,888,536 [2] or US 2006/0097991 [3]. These techniques are used for detecting and processing multiple simultaneous touches on a sensor array so that a first finger can be used to control a cursor (similar to a conventional touch pad on a laptop computer) and a second finger to provide actuations (similar to a conventional mechanical button provided adjacent to a touch pad) for example.

In addition to being able to detect two or more touches simultaneously in a single frame it is also necessary to track touches that are detected in one sample time-frame of a touch panel to the next sample time-frame. This could be used for providing gestures on a trackpad or moving a cursor across a display, either using an independent touch panel or a touch panel incorporated into the display.

A method for tracking multiple touches has been previously proposed in our unpublished U.S. patent application 60/949,376 [4]. An example method for tracking two touches adjacent a touch panel is described below. For example, two touches are sensed at two positions in a first time-frame (t1) on a touch panel and after a given time interval, two touches are sensed at two positions in a second time-frame (t2). To determine which touch at time t1 tracks to which touch at time t2, the path lengths of all of the possible paths between the touch locations are calculated. The total distance for each of the combinations is found by using the x- and y-coordinates of the four touch positions. The combination with the lowest distance value represents the smallest tracking distance for the two objects which is deemed to be the most likely combination of tracking for the two objects. However, when tracking objects adjacent a touch panel, a maximum allowable tracking distance over which one object can track from one position to another could be applied. For example, if a first touch is detected on the position sensor at one time interval and then a second touch is detected at the next time interval, but the distance between the two touches was above the predetermined maximum distance, then the second touch is treated as a new object and not the same object moving from the first touch position.

The tracking algorithm described above can be extended to higher numbers of touches, but the number of calculations that are required for 'n' touches is n! Therefore, it becomes computationally difficult to track the touches as the number of touches increase, especially if a microcontroller is to be used. The tracking algorithm will also break down when multiple touches are closer together than their movement distance from frame-to-frame, since the result will depend on the order in which the touch coordinates are processed.

A prior art method for tracking multiple objects adjacent a touch 2D proximity sensor array is discussed in U.S. Pat. No. 6,888,536 [2]. The current locations of the surface contacts are predicted along existing trajectories using path positions and velocities measured from previous images. The closest active path for each group of contacts is found and the distance along the active path is recorded. Each group of contacts is paired with its closest path, providing the distance between them is less than the tracking radius. Any group which is not paired with an active or recently deactivated path is allocated as a new path, representing touch of a new finger on the surface. Any active path which cannot be paired with a group is deactivated, representing lift-off from the surface. This method uses full scale numeric processing requiring a digital signal processor or microprocessor, and is beyond the capabilities of a microcontroller.

There is therefore a need for a reliable multitouch tracking algorithm that can be carried out on a microcontroller or other integrated circuit device with limited processing power and memory capacity.

SUMMARY OF THE INVENTION

According to the invention there is provided a method of tracking multiple touches over time, wherein a touch data set is provided for each time frame, each touch data set in general comprising a plurality of touch coordinates, and each touch coordinate defining a touch, the method comprising:

a) providing first and second touch data sets for first and second time frames;

b) determining the closest touch in the second time frame to each of the touches in the first time frame, and calculating the separation between each such pair of touches;

c) starting with the pair of touches having the smallest separation, validating each pair until a pairing is attempted between touches for which the touch in the second time frame has already been paired;

d) whereupon the as-yet unpaired touches from the first and second touch data sets are re-processed by re-applying steps b) and c) if necessary a plurality of times.

The touches from the first and second time frames are thus provisionally paired in step b) according to their mutual proximity, and this pairing is then confirmed or validated in step c) unless it would result in a bigamous or degenerate pairing involving a touch in the second time frame that has been paired already. Another way of describing this approach is to observe that if a touch in the second time frame is closest to two or more touches in the first time frame, the pairing that is chosen is the one with the minimum separation.

The time order is arbitrary, by which it is meant that either the coordinates of the earlier of the two time frames can be used as a basis for the distance calculations, or the later of the two. In this respect it is noted that reference to the first and second time frames in the above definition of the invention does not imply that the first time frame is an earlier time frame (or a later time frame) than the second time frame. Both possibilities lie within the scope of the invention.

Significantly, the method avoids the need to calculate the separation distances of all of the possible paths between the multiple touch locations, and instead uses a selective recalculation only when needed to prevent a single touch in one time frame being paired with multiple touches in another time frame. The method also avoids complex algebra and floating point operations, and has little memory requirement, since all processing is based on comparing only two touch data sets and does not involve any path prediction or historical velocity considerations taken from multiple preceding time frames.

The method is preferably implemented such that pairings are not made if the distance between provisionally paired touches exceeds a threshold distance. In such cases, the touches are deemed to be separate actuations rather than a single moving actuation. For example, in step c), pairings are not validated if the distance between provisionally paired touches exceeds a threshold distance. More preferably, if the pair of touches having the smallest separation, i.e. the closest pair, are separated by more than the threshold distance, then no more pairings are sought between touches in the first and second touch data sets.

The invention also relates to a device for processing touch data to track multiple touches over time between successive time frames, wherein the device is configured to perform any of the above defined methods according to the invention, and further defined aspects described in the detailed description. The device is preferably a microcontroller, or at least comprises a microcontroller.

The advantage of the claimed invention is that objects adjacent a touch panel can be tracked between polling cycles or time-frames using a few simple calculations and less computation time.

The invention therefore provides a reliable multitouch tracking algorithm that is sufficiently simple to run in real time on a microcontroller, or other integrated circuit device with limited processing power and memory capacity. The multitouch tracking algorithm is preferably hosted in non-volatile memory on the microcontroller. During operation, the microcontroller will output data to an output port in the form of touch co-ordinates ordered in, or tagged by, tracked touches obtained by the method of the invention.

The higher level systems component receiving the output from the microcontroller thus receives pre-processed touch data, rather than raw touch data in need of pre-processing to determine which touches in which frames are associated with each other.

It will be understood from the common general knowledge of the skilled person that a microcontroller is an integrated circuit containing the basic operational units of a microprocessor system to allow autonomous functioning, namely a microprocessor, volatile and non-volatile memory, and input/output functions, but with orders of magnitude lower integration scale and hence cost and power consumption, than a state of the art central processing unit (CPU), graphics processing unit (GPU) or digital signal processor (DSP) as used in personal computers. Microcontrollers are used to execute small control programs in real time, such as the method of the invention, and operate autonomously or independently to carry out their designated function. The control program is often stored on the microcontroller in non-volatile memory, i.e. as firmware. In particular, the touch tracking algorithm of the present invention can be stored in non-volatile memory on the host microcontroller or other device.

If desired, higher level gesture processing may also be incorporated in the microcontroller or other device, such as for identifying any of the following gestures: tap, double tap, press, flick, drag, pinch, stretch or rotate.

BRIEF DESCRIPTION OF THE DRAWINGS

For a better understanding of the invention, and to show how the same may be carried into effect, reference is now made by way of example to the accompanying drawings, in which.

DETAILED DESCRIPTION

Figure 1:
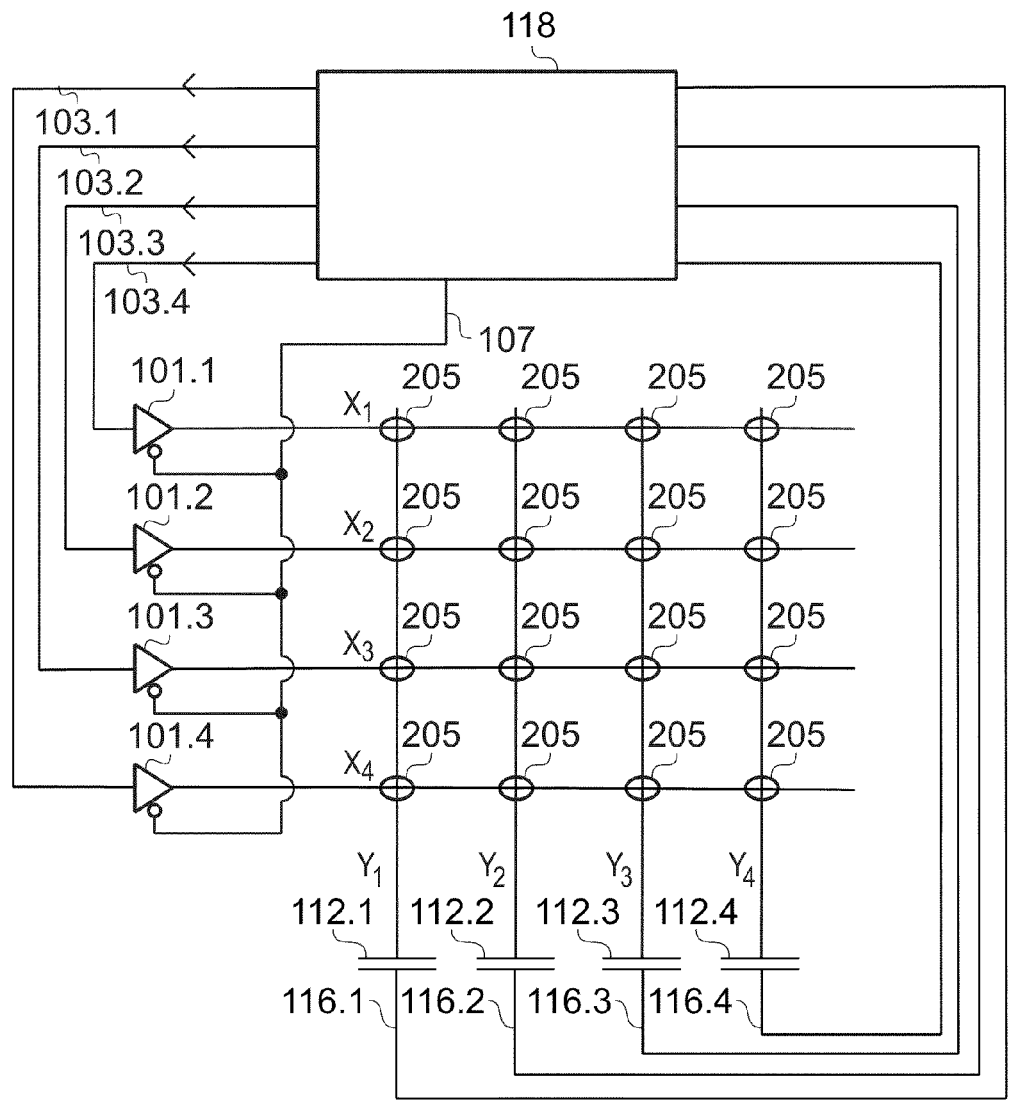
FIG. 1 is a schematic view of a capacitive position sensor array and connected circuitry according to an embodiment of the invention.

FIG. 1 is a circuit diagram illustrating a touch sensitive matrix providing a two-dimensional capacitive transducing sensor arrangement according to an embodiment of the invention. The touch panel shown in FIG. 1 has 4 row electrodes and 4 column electrodes. It will be appreciated that the number of columns and rows may be chosen as desired, another example being twelve columns and eight rows or any other practical number of columns and rows.

The array of sensing nodes is accommodated in or under a substrate, such as a glass panel, by extending suitably shaped and dimensioned electrodes. The sensing electrodes define a sensing area within which the position of an object (e.g. a finger or stylus) to the sensor may be determined. For applications in which the sensor overlies a display, such as a liquid crystal display (LCD), the substrate may be of a transparent plastic material and the electrodes are formed from a transparent film of Indium Tin Oxide (ITO) deposited on the substrate using conventional techniques. Thus the sensing area of the sensor is transparent and can be placed over a display screen without obscuring what is displayed behind the sensing area. In other examples the position sensor may not be intended to be located over a display and may not be transparent; in these instances the ITO layer may be replaced with a more economical material such as a copper laminate Printed Circuit Board (PCB), for example.

There is considerable design freedom in respect of the pattern of the sensing electrodes on the substrate. All that is important is that they divide the sensing area into an array (grid) of sensing cells arranged into rows and columns. (It is noted that the terms "row" and "column" are used here to conveniently distinguish between two directions and should not be interpreted to imply either a vertical or a horizontal orientation.) Some example electrode patterns are disclosed in US 2008/0246496 A1 [7] for example, the contents of which are incorporated in their entirety.

It will be recognized by the skilled reader that the sensor illustrated in FIG. 2 is of the active type, i.e. based on measuring the capacitive coupling between two electrodes (rather than between a single sensing electrode and a system ground). The principles underlying active capacitive sensing techniques are described in U.S. Pat. No. 6,452,514 [6]. In an active-type sensor, one electrode, the so called drive electrode, is supplied with an oscillating drive signal. The degree of capacitive coupling of the drive signal to the sense electrode is determined by measuring the amount of charge transferred to the sense electrode by the oscillating drive signal. The amount of charge transferred, i.e. the strength of the signal seen at the sense electrode, is a measure of the capacitive coupling between the electrodes. When there is no pointing object near to the electrodes, the measured signal on the sense electrode has a background or quiescent value. However, when a pointing object, e.g. a user's finger, approaches the electrodes (or more particularly approaches near to the region separating the electrodes), the pointing object acts as a virtual ground and sinks some of the drive signal (charge) from the drive electrode. This acts to reduce the strength of the component of the drive signal coupled to the sense electrode. Thus a decrease in measured signal on the sense electrode is taken to indicate the presence of a pointing object.

The illustrated m×n array is a 4×4 array comprising 4 drive lines, referred to as X lines in the following, and four sense lines, referred to as Y lines in the following. Where the X and Y lines cross-over in the illustration there is a sensing node 205. In reality the X and Y lines are on different layers of the touch panel separated by a dielectric, so that they are capacitively coupled, i.e. not in ohmic contact. At each node 205, a capacitance is formed between adjacent portions of the X and Y lines, this capacitance usually being referred to as $C_E$ or $C_x$ in the art, effectively being a coupling capacitor. The presence of an actuating body, such as a finger or stylus, has the effect of introducing shunting capacitances which are then grounded via the body by an equivalent grounding capacitor to ground or earth. Thus the presence of the body affects the amount of charge transferred from the Y side of the coupling capacitor and therefore provides a way of detecting the presence of the body. This is because the capacitance between the X and Y "plates" of each sensing node reduces as the grounding capacitances caused by a touch increase. This is well known in the art.

In use, each of the X lines is driven in turn to acquire a full frame of data from the sensor array. To do this, a controller 118 actuates the drive circuits 101.1, 101.2, 101.3, 101.4 via control lines 103.1, 103.2, 103.3 and 103.4 to drive each of the X lines in turn. A further control line 107 to the drive circuits provides an output enable to float the output to the X plate of the relevant X line.

For each X line, charge is transferred to a respective charge measurement capacitor Cs 112.1, 112.2, 112.3, 112.4 connected to respective ones of the Y lines. The transfer of charge from the coupling capacitors 205 to the charge measurement capacitors Cs takes place under the action of switches that are controlled by the controller. For simplicity neither the switches or their control lines are illustrated. Further details can be found in U.S. Pat. No. 6,452,514 [6] and WO-00/44018 [8].

The charge held on the charge measurement capacitor Cs 112.1, 112.2, 112.3, 112.4 is measurable by the controller 118 via respective connection lines 116.1, 116.2, 116.3, 116.4 through an analog to digital converter (not shown) internal to the controller 118.

More details for the operation of such a matrix circuit are disclosed in U.S. Pat. No. 6,452,514 [6] and WO-00/44018 [8].

The controller may be a single logic device such as a microcontroller. The microcontroller may preferably have a push-pull type CMOS pin structure. The necessary functions may be provided by a single general purpose programmable microprocessor, microcontroller or other integrated chip, for example a field programmable gate array (FPGA) or application specific integrated chip (ASIC).

Figure 2A:
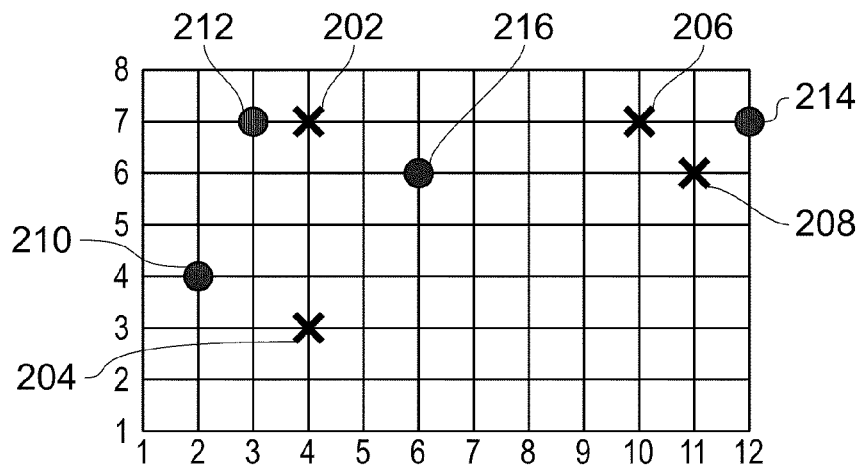
FIG. 2A-D schematically shows a series of matrix type touch panels illustrating how multiple touches adjacent a touch panel from two sequential time-frames are tracked from one time-frame to the next time frame.
Figure 2B:
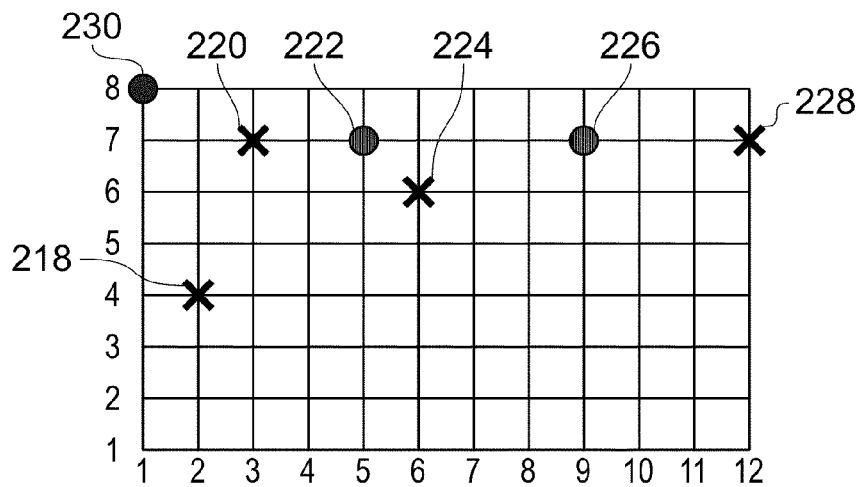
Figure 2C:
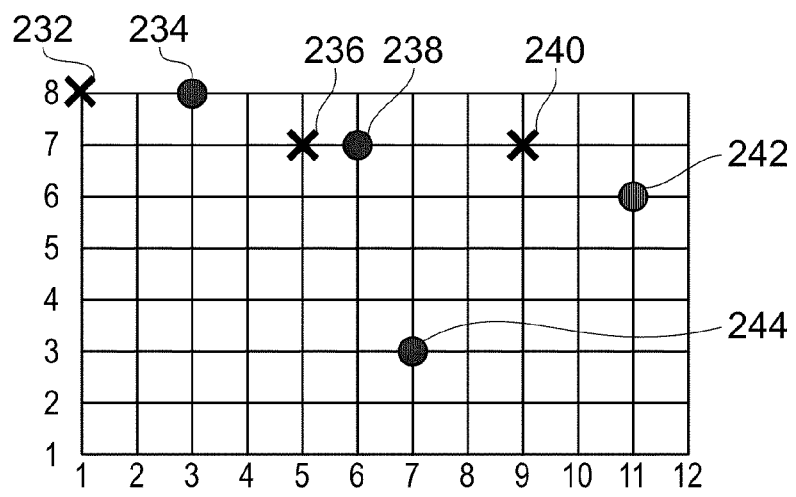

FIGS. 2A-C shows the evolution of a plurality of touches on a touch panel over a succession of time frames $t_1$ $t_2$ $t_3$ and $t_4$. FIG. 2A relates to time frames $t_1$ and $t_2$, FIG. 2B relates to time frames $t_2$ and $t_3$, and FIG. 2C relates to time frames $t_3$ and $t_4$. It is noted that the touch panels shown in FIGS. 2A-C have an 8×12 electrode array, rather than the 5×3 electrode array shown in FIG. 1. This is of no significance to the principles of operation. In particular, the algorithm described below can be applied to touch panels with an arbitrary number of sensor nodes.

For simplicity of explanation in the following, the touch coordinates are taken to be at the sensor nodes, i.e. at the intersection between the x- and y-electrodes. However, it will be appreciated that post-processing is often applied in practice to interpolate between signals obtained from adjacent contiguous groups of nodes, as is known in the art, thereby producing touch coordinates that lie intermediate between node positions.

The touch positions shown in FIGS. 2A-C are shown using two different symbols, where previous touches are symbolized using a crosses and the current touches are symbolized using circles.

It will be appreciated that more or fewer touches could be detected. It will also be appreciated that the coordinates of the objects adjacent the touch panel could have been found using one of the methods disclosed in U.S. Pat. No. 5,825,352 [1], U.S. Pat. No. 6,888,536 [2] or US 2006/0097991 [3] or any other method known to the skilled person to determine the coordinates of multiple objects simultaneously adjacent a touch panel.

With current technology a typical panel of a capacitive sensor with multitouch capability will have a matrix of perhaps between 3×4 and 12×12 nodes, with the tendency that this number is steadily increasing, so that up to 20×20 nodes may be expected in the near future.

Figure 3:
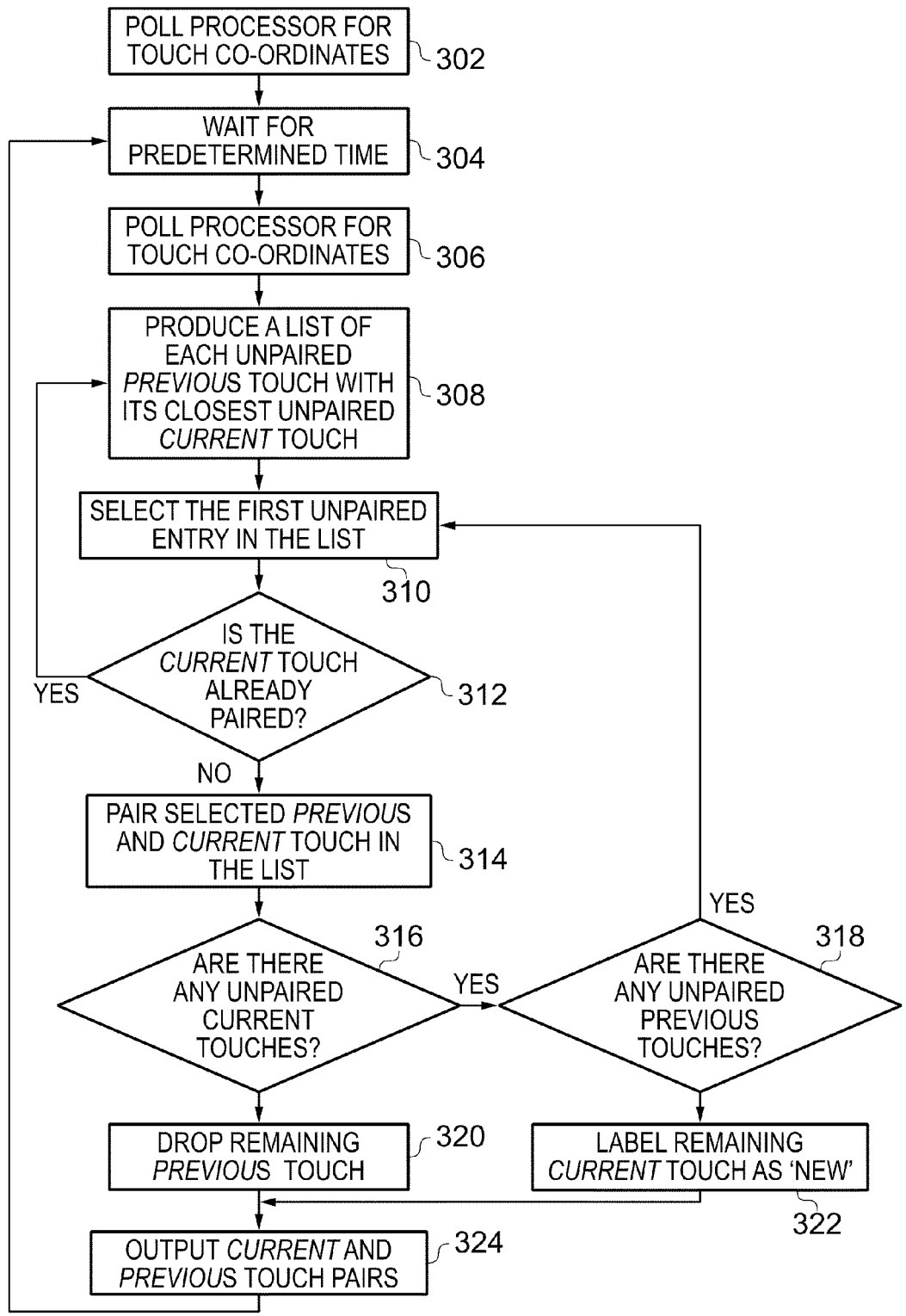
FIG. 3 is a flow diagram of the process of an embodiment of the invention.

FIG. 3 will now be used to describe how the multiple touches are tracked from one time to the next with reference to FIGS. 2A-C.

FIG. 3 shows a flow chart of the algorithm of an embodiment of the invention. The host controller 109 shown in FIG. 1 is used to apply the algorithm described. The algorithm shown in FIG. 3 is now described.

Before describing the detailed process flow, it is noted that the tracking process of the invention is essentially a two-stage process, wherein, in the first stage previous and current touches are provisionally paired, and in the second stage each of the provisional pairings is either confirmed or discarded depending on whether any conflicts are detected. The touch coordinates belonging to the discarded provisional pairings are then re-processed by the same basic process, and this is repeated as many times as are needed to process the touch data fully. The basic process is therefore carried out iteratively on progressively smaller subsets of the touch data sets.

The term "previous touch" will be used throughout to identify a touch that was detected in the previous time-frame.

The term "current touch" will be used throughout to identify a touch that was detected in the current time-frame.

The term "touch data set" is used to describe the touch coordinates output from a single frame or sample of the touch screen, so the process of the invention operates by jointly processing a previous touch data set and a current touch data set.

The term "provisionally paired" will be used throughout to indicate the pairings identified in the first stage of the process, and the term "paired" will generally be used to indicate that the pairing has been confirmed or validated in the second stage of the process. The terms confirmed pairing or validated pairing or similar may be used occasionally to emphasize the distinction from provisional pairings.

The process makes provisional pairings between each current touch and its closest previous touch. In view of this rule, it will be understood that there will not in general be a one-to-one mapping between previous and current touches. For example, a particular current touch may be closer to two different previous touches than any other current touch.

The process is now described with reference to FIG. 3.

In step 302, the processor of a touch panel is polled to obtain the co-ordinates of any touches adjacent the touch panel. This is the first time that the touch panel is polled so these are all considered to be "new" touches. The term "new touch" will be used throughout to identify any touch adjacent the touch panel that was not present in the previous time frame.

In step 304, a predetermined time is elapsed before polling the processor for another set of touch co-ordinates. The predetermined time is typically 10 ms, but could be in the range of 1 ms to 1 s.

In step 306, the processor of a touch panel is polled to obtain the co-ordinates of any touches adjacent the touch panel. Once two sets of touch co-ordinates have been obtained for two consecutive time intervals, the touches adjacent to the touch panel are tracked.

In step 308, a list or table is produced that contains each of the unpaired previous touches provisionally paired with a respective current touch. The list is ordered by separation distance such that the provisionally paired previous and current touches with the shortest distance between them appear at the top of the list and those provisional pairs that are farthest apart appear at the bottom of the list.

In step 310, the first previous touch in the list is selected, which will by definition be unpaired. (However, for subsequent traversals of step 310 in the process flow this will not generally be true.) All previous touches that are already paired, i.e. confirmed as paired, are ignored.

In step 312, it is checked if the current touch has already been paired with another previous touch higher up the list, i.e. one that is closer to it. If such a closer pairing exists, the list needs recalculating for all pairings from the present one to the bottom of the list, i.e. the most distant ones, in which case the process will go to step 308, where a new list of all the unpaired touches is produced. If the provisionally paired current touch is not already paired with another previous touch the process moves to step 314.

In step 314, the provisionally paired previous touch and current touch are paired, i.e. their pairing is confirmed or validated.

In step 316, each of the current touches are searched to establish whether any of the current touches have not been paired with a previous touch. If there are no more current touches that have not already been paired, the process goes to step 320. If there are remaining unpaired current touches the process goes to step 318.

In step 320, any remaining previous touches that have not been paired with a current touch are considered to have been dropped. The term "dropped" means that an object that was adjacent the touch panel in the previous time frame is no longer adjacent the touch panel in the current time frame, i.e. has been lifted off.

In step 318, the previous touches are searched for any unpaired previous touches. If there are remaining unpaired previous touches, then the process goes to step 310, since there are still unpaired previous and current touches. However, if there are no unpaired previous touches, then the process goes to step 322.

In step 322, any remaining current touches that have not been paired, are labeled as new touches.

Following steps 320 and 322, the process goes to step 324, where the paired touch coordinates are output for tracking purposes.

Following step 324, the process goes to step 304, where the process waits for a predetermined time before repeating the whole process. This process will run continuously until it is terminated.

A desirable additional feature to distinguish a single moving touch from two separate touches is to prevent validation of any pairings if the distance between provisionally paired touches exceeds a threshold distance. An efficient way of implementing this is to include an additional test in step 310. Namely, in step 310 it is tested if the pair of touches having the smallest separation, i.e. the top row of the ordered list, are separated by more than the threshold distance. If this is the case, then no more pairings are sought between touches in the previous and current touch data sets, and process flow jumps from step 310 to step 304.

FIGS. 2A-C are now used to illustrate how the algorithm described above with reference to FIG. 3 is implemented in a 12×8 touch matrix for example.

FIG. 2A shows two sets of touch co-ordinates, namely a current set of touches 210, 212, 214 and 216 and a previous set of touches 202, 204, 206 and 208. FIG. 2A illustrates the process shown in FIG. 3 at step 306, where the processor has been polled twice to obtain two consecutive touch data sets.

Table 1 shows a list of each of the unpaired previous touches with their provisionally paired current touches from FIG. 2A, with the distance between each of these shown in the right hand column. The table is sorted by inter-touch separation distance, i.e. by the right hand column.

TABLE 1

| Previous touch | Current touch | Distance |
| --- | --- | --- |
| 202 | 212 | 1 |
| 208 | 214 | 1.4 |
| 206 | 214 | 2 |
| 204 | 210 | 2.2 |

In Table 1, the first provisionally paired previous and current touches are paired, since current touch 212 has not already been paired. Therefore, previous touch 202 is paired with current touch 212. There are still remaining unpaired current and previous touches, so the process returns to the list shown in Table 1. However, since touches 202 and 212 have been paired, the next two provisionally paired previous and current touches 208 and 214 are selected. The current touch 214 is not yet paired. Therefore, previous touch 208 is paired with current touch 214. Again there are still unpaired previous and current touches in the list in Table 1, so the process returns to the list in Table 1. The first two rows of touches are now paired, so previous touch 206 and current touch 214 are selected (third row). However, current touch 214 is already paired. Therefore, a new list is produced containing each of the unpaired previous touches provisionally paired with the closest current touch, as shown in Table 2.

TABLE 2

| Previous touch | Current touch | Distance |
|---|---|---|
| 204 | 210 | 2.2 |
| 206 | 216 | 4.1 |

In Table 2, the first provisionally paired previous and current touches 204 and 210 are paired, since current touch 210 has not already been paired. Therefore, previous touch 204 is paired with current touch 210. There are still remaining unpaired current and previous touches in Table 2, so the process returns to the list shown in Table 2. However, since touches 204 and 210 have been paired, the next two provisionally paired previous and current touches 206 and 216 are selected. The current touch 216 is not yet paired. Therefore, previous touch 206 is paired with current touch 216. Now there are no longer any unpaired previous or current touches in the list in Table 2. The previous and current touches from FIG. 2A are paired and output as follows:

Previous touch 202 is paired with current touch 212
Previous touch 208 is paired with current touch 214
Previous touch 204 is paired with current touch 210
Previous touch 206 is paired with current touch 216

When the paired touches are output, a predetermined time is elapsed before polling the processor again for a new set of touch coordinates. When a new set of touch coordinates are obtained, the current touches from the previous time-frame are labeled as the previous touches in the current time-frame.

FIG. 2B shows the same touch panel after a predetermined time has elapsed. It is clear from FIG. 2B that the touches shown as circles in FIG. 2A are now shown as crosses. Table 3 shows a list of each of the unpaired previous touches with their provisionally paired current touches from FIG. 2B, with the distance between each of these shown in the right hand column.

TABLE 3

| Previous touch | Current touch | Distance |
|---|---|---|
| 224 | 222 | 1.4 |
| 220 | 222 | 2 |
| 228 | 226 | 3 |
| 218 | 230 | 3.9 |

In Table 3, the first provisionally paired previous and current touches 224 and 222 are paired, since current touch 222 has not already been paired. Therefore, previous touch 224 is paired with current touch 222. There are still remaining unpaired current and previous touches in Table 3, so the process returns to the list shown in Table 3. However, since touches 202 and 212 have been paired, the next two provisionally paired previous and current touches are selected. Current touch 220 is already paired therefore a new list is produced containing each of the unpaired previous touches provisionally paired with the closest current touch, as shown in Table 4.

TABLE 4

| Previous touch | Current touch | Distance |
|---|---|---|
| 220 | 230 | 2.2 |
| 228 | 226 | 3 |
| 218 | 230 | 3.9 |

In Table 4, the first provisionally paired previous and current touches are paired, since current touch 230 has not already been paired. Therefore, previous touch 220 is paired with current touch 230. There are still remaining unpaired current and previous touches in Table 4, so the process returns to the list shown in Table 4. However, since touches 220 and 230 have been paired, the next two provisionally paired previous and current touches are selected. The current touch 226 is not yet paired. Therefore, previous touch 228 is paired with current touch 226. There are no longer any unpaired current touches, so any remaining previous touches are dropped. Each of the previous and current touches from FIG. 2B are paired and output as follows:

Previous touch 224 is paired with current touch 222
Previous touch 220 is paired with current touch 230
Previous touch 228 is paired with current touch 226
Previous touch 218 is dropped.

FIG. 2C shows the same touch panel after a predetermined time has elapsed. It is clear from FIG. 2C that the touches shown as circles in FIG. 2B are now shown as crosses. Table 5 shows a list of each of the unpaired previous touches with their provisionally paired current touches from FIG. 2C, with the distance between each of these shown in the right hand column.

TABLE 5

| Previous touch | Current touch | Distance |
|---|---|---|
| 236 | 238 | 1 |
| 232 | 234 | 2 |
| 240 | 242 | 2.2 |
| — | 244 | — |

In Table 5 the first provisionally paired previous and current touches are paired, since current touch 238 has not already been paired. Therefore, previous touch 236 is paired with current touch 234. There are still remaining unpaired current and previous touches in Table 5, so the process returns to the list shown in Table 5. However, since touches 236 and 238 have been paired, the next two provisionally paired previous and current touches are selected. The current touch 234 is not yet paired. Therefore, previous touch 232 is paired with current touch 234. Again there are still unpaired previous and current touches in the list in Table 5, so the process returns to the list in Table 5. The next two unpaired touches in Table 5 are previous touch 240 and current touch 242. Current touch 242 is unpaired. Therefore, previous touch 240 is paired with current touch 242. There is one current touch remaining in the list in Table 5 that is unpaired. However, since there are no longer any unpaired previous touches, current touch 244 is labeled as new. The previous and current touches from FIG. 2C are paired and output as follows:

Previous touch 236 is paired with current touch 238
Previous touch 232 is paired with current touch 234

Previous touch 240 is paired with current touch 242
Current touch 244 is labeled as a new touch The process is now repeated by allowing a predetermined time to elapse before polling the processor for another set of touch coordinates for a new set of touches adjacent the touch panel. This process continues until it is terminated.

Figure 2D:
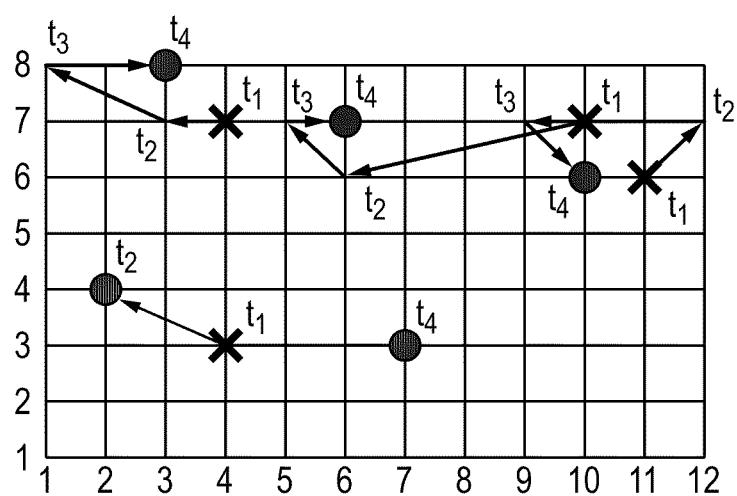

FIG. 2D summarizes the outcome of the processing of the four sequential time frames $t_1$ $t_2$ $t_3$ and $t_4$ to track the touch motion, where FIG. 2A relates to time frames $t_1$ and $t_2$, FIG. 2B relates to time frames $t_2$ and $t_3$, and FIG. 2C relates to time frames $t_3$ and $t_4$. Each of the tracked touches is shown by arrowed lines. The tracked touches shown in FIG. 2D are summarized in Table 6 below.

TABLE 6

| | Touches/objects adjacent touch panel | | | | |
|---|---|---|---|---|---|
| Time frame | 1 | 2 | 3 | 4 | 5 |
| $t_1$ | (4, 7) | (4, 3) | (10, 7) | (11, 6) | (—, —) |
| $t_2$ | (3, 7) | (2, 4) | (6, 6) | (12, 7) | (—, —) |
| $t_3$ | (1, 8) | (—, —) | (5, 7) | (9, 7) | (—, —) |
| $t_4$ | (3, 8) | (—, —) | (6, 7) | (10, 6) | (7, 3) |

Table 6 shows the touches being tracked over four timeframes, namely $t_1$ and $t_4$. "Touch 2" terminates after $t_2$ and a new "Touch 5" appears in time-frame $t_4$. It will be appreciated that a different label/identifier could be used to identify a new touch that has not already been used. However, over time multiple new touches could be identified and it could become difficult to label each new touch with a unique identifier. Furthermore, each touch panel could be limited to discriminate and track a fixed number of touches. If this is the case it is preferred that the same labels are used to identify the touches, such as that shown in Table 6.

To summarize, in the prior art approach discussed further above, tracking of 'n' objects was shown to take n! calculations. However, in the embodiment of the invention the number of calculations is not more than $(n^2+n)/2$ which scales considerably more favorably with increasing numbers of touches than n! Consequently, objects adjacent a touch panel can be tracked between polling cycles or time-frames using fewer calculations and less computation time. Furthermore, if the tracking algorithm is quicker, the time between polling may be decreased.

The present algorithm is thus scalable to larger numbers of simultaneous touches with a lesser increase in computing power being required. For example, a device capable of tracking up to 3, 4, 5, 6, 7, 8, 9 or 10 simultaneous touches can be made with modest computing power, as available in a microcontroller.

It is also noted that the time order is arbitrary, by which it is meant that the ordered list tables could be constructed based on the current touch instead of the previous touch coordinates as they are in the above described embodiment.

The process described above assumes that, if the same number of touches is detected in two subsequent time-frames, each of the previous touches would be paired with one of each of the current touches. However, in other embodiments this might not be the case. For example, an upper threshold for the distance that an object can be tracked over a touch panel may be specified. Thus, if the distance between two touches is greater than a specified threshold, the previous touch is dropped and the current touch is assigned as a new touch, i.e. not tracked.

Figure 4:
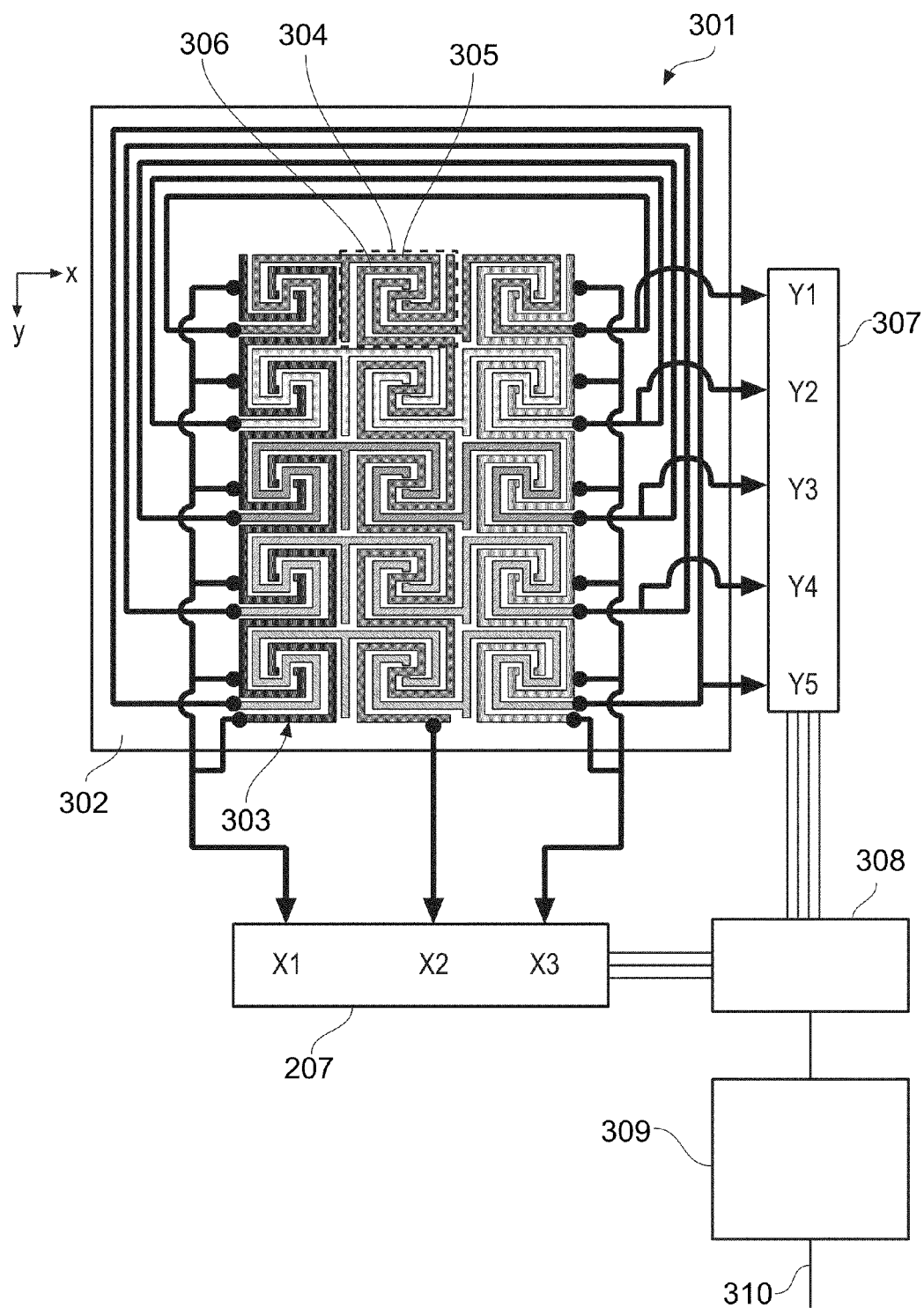
FIG. 4 is a schematic view of a capacitive position sensor array and connected circuitry according to another embodiment of the invention.

In the embodiment described above each list is made of each of the previous touches with the closest current touch provisionally paired with it. However, it will be appreciated that the same result is obtained if all of the possible paths for each of the previous touches are first listed and the algorithm described above searches the list for the shortest path length for each of the unpaired previous touches, starting with the shortest path length in the list. Such a variant falls within the scope of the present invention FIG. 4 schematically shows in plan view a 2D touch-sensitive capacitive position sensor 301 and accompanying circuitry according to an passive-type sensor embodiment of the invention.

The 2D touch-sensitive capacitive position sensor 301 is operable to determine the position of objects along a first (x) and a second (y) direction, the orientation of which are shown towards the top left of the drawing. The sensor 301 comprises a substrate 302 having sensing electrodes 303 arranged thereon. The sensing electrodes 303 define a sensing area within which the position of an object (e.g. a finger or stylus) to the sensor may be determined. The substrate 302 is of a transparent plastic material and the electrodes are formed from a transparent film of Indium Tin Oxide (ITO) deposited on the substrate 302 using conventional techniques. Thus the sensing area of the sensor is transparent and can be placed over a display screen without obscuring what is displayed behind the sensing area. In other examples the position sensor may not be intended to be located over a display and may not be transparent; in these instances the ITO layer may be replaced with a more economical material such as a copper laminate Printed Circuit Board (PCB), for example.

The pattern of the sensing electrodes on the substrate 302 is such as to divide the sensing area into an array (grid) of sensing cells 304 arranged into rows and columns. (It is noted that the terms "row" and "column" are used here to conveniently distinguish between two directions and should not be interpreted to imply either a vertical or a horizontal orientation.) In this position sensor there are three columns of sensing cells aligned with the x-direction and five rows of sensing cells aligned with the y-direction (fifteen sensing cells in total). The top-most row of sensing cells is referred to as row Y1, the next one down as row Y2, and so on down to row Y5. The columns of sensing cells are similarly referred to from left to right as columns X1 to X3.

Each sensing cell includes a row sensing electrode 305 and a column sensing electrode 306. The row sensing electrodes 305 and column sensing electrodes 106 are arranged within each sensing cell 304 to interleave with one another (in this case by squared spiraling around one another), but are not galvanically connected. Because the row and the column sensing electrodes are interleaved (intertwined), an object adjacent to a given sensing cell can provide a significant capacitive coupling to both sensing electrodes irrespective of where in the sensing cell the object is positioned. The characteristic scale of interleaving may be on the order of, or smaller than, the capacitive footprint of the finger, stylus or other actuating object in order to provide the best results. The size and shape of the sensing cell 304 can be comparable to that of the object to be detected or larger (within practical limits).

The row sensing electrodes 305 of all sensing cells in the same row are electrically connected together to form five separate rows of row sensing electrodes. Similarly, the column sensing electrodes 306 of all sensing cells in the same column are electrically connected together to form three separate columns of column sensing electrodes.

The position sensor 301 further comprises a series of capacitance measurement channels 307 coupled to respective ones of the rows of row sensing electrodes and the columns of column sensing electrodes. Each measurement channel is operable to generate a signal indicative of a value of capacitance between the associated column or row of sensing electrodes and a system ground. The capacitance measurement channels 307 are shown as two separate banks with one bank coupled to the rows of row sensing electrodes (measurement channels labeled Y1 to Y5) and one bank coupled to the columns of column sensing electrodes (measurement channels labeled X1 to X3). However, it will be appreciated that in practice all of the measurement channel circuitry will most likely be provided in a single unit such as a programmable or application specific integrated circuit. Furthermore, although eight separate measurement channels are shown, the capacitance measurement channels could alternatively be provided by a single capacitance measurement channel with appropriate multiplexing, although this is not a preferred mode of operation. Moreover, circuitry of the kind described in U.S. Pat. No. 5,463,388 [5] or similar can be used, which drives all the rows and columns with a single oscillator simultaneously in order to propagate a laminar set of sensing fields through the overlying substrate.

The signals indicative of the capacitance values measured by the measurement channels 307 are provided to a processor 308 comprising processing circuitry. The position sensor will be treated as a series of discrete keys or nodes. The position of each discrete key or nodes is the intersection of the x- and y-conducting lines. The processing circuitry is configured to determine which of the discrete keys or nodes has a signal indicative of capacitance associated with it. A host controller 309 is connected to receive the signals output from the processor 308, i.e. signals from each of the discrete keys or nodes indicative of an applied capacitive load. The processed data can then be output by the controller 309 to other systems components on output line 310.

In summary of the detailed description, a method has been described for tracking multiple simultaneous objects adjacent a touch screen from a data set output from the touch screen comprising an array of sensing nodes. The data set comprises a set of two-dimensional coordinates for a first time-frame and a set of two-dimensional coordinates for a second time-frame. The method comprises:

a) receiving said data set as an input;
b) calculating the distance from each of the set of coordinates in the first time frame to the closest one of the set of coordinates in the second time frame;
c) producing an ordered list by distance of the set of coordinates in the first time frame provisionally paired with the closest one of the set of coordinates in the second time frame;
d) sequentially pairing each of the set of coordinates from the first time frame with an unpaired set of coordinates in the second time frame in the ordered list until one of the set of coordinates in the second time frame is already paired or until there are no unpaired set of coordinates from the first and second time frame;
e) repeating steps b) to d) if there are at least one unpaired set of coordinates from the first time frame and one unpaired set of coordinates in the second time frame; and
f) outputting the paired set of coordinates from the first and second time frame.

A 2D touch-sensitive capacitive position sensor has also been described for implementing the method of the invention, the sensor comprising: (a) a touch panel having a plurality of sensing elements distributed over its area; (b) a capacitance measurement circuit connected to the sensing elements and operable repeatedly to acquire sets of capacitance signal values, each set being made up of a capacitance signal value from each of the sensing elements; and (c) a processor connected to successively receive touch data sets of two-dimensional coordinates from successive time-frames, process them according to the above method, and output processed touch data in which tracking between touches in successive time frames is identified.

It will be appreciated that the above description assumes that the two touch data sets processed by the invention are from immediately successive time frames, but this need not be the case. In principle, the two time frames being compared could be separated by one or more other time frames.

Although the invention has been described in the detailed description with reference to capacitive touch sensors, it will be appreciated that the method of the invention can be applied to any type of touch sensor device in one-, two- or, in principle, three-dimensional touch data sets. It will be appreciated that there are several other touch sensing technologies, such as those based on resistive screens, which typically operate with stylus input, and technologies developed for large areas, such as those based on ultrasonics or other acoustic techniques, and those based on total internal reflection, or other optical techniques. All of these touch technologies may benefit from the present invention.

REFERENCES

[1] U.S. Pat. No. 5,825,352
[2] U.S. Pat. No. 6,888,536
[3] US 2006/0097991 A1
[4] U.S. 60/949,376
[5] U.S. Pat. No. 5,463,388
[6] U.S. Pat. No. 6,452,514
[7] US 2008/0246496 A1
[8] WO-00/44018

What is claimed:
1. A method comprising:
determining, using one or more circuits, a first set of provisional pairings, each provisional pairing of the first set of provisional pairings comprising coordinates from a first set of coordinates and coordinates from a second set of coordinates, the first set of coordinates and the second set of coordinates corresponding to a plurality of touches detected by a touch sensor;
calculating a plurality of distances, each distance corresponding to a provisional pairing of the first set of provisional pairings;
validating, using the one or more circuits, a first provisional pairing of the first set of provisional pairings based on calculating the plurality of distances, the first provisional pairing comprising a first coordinate of the second set of coordinates;
determining, using the one or more circuits, that a second provisional pairing of the first set of provisional pairings is not valid in response to determining that:
the second provisional pairing comprises the same first coordinate as the first provisional pairing; and
the first provisional pairing has been validated; and
in response to determining that the second provisional pairing of the first set of provisional pairings is not valid, determining, using the one or more circuits, a second set of provisional pairings, each provisional pairing of the second set of provisional pairings comprising coordinates from the first set of coordinates and coordinates from the second set of coordinates.

2. The method of claim 1, wherein validating the first provisional pairing comprises determining that a distance of the plurality of distances associated with the coordinates comprised by the first provisional pairing is less than a threshold.

3. The method of claim 1, wherein the first set of coordinates correspond to a first time frame and the second set of coordinates correspond to a second time frame, the second time frame occurring after the first time frame.

4. The method of claim 1, wherein each of the one or more circuits comprises one or more of the following:
a processor; and
a controller.

5. The method of claim 1, wherein determining the second set of provisional pairings comprises determining the second set of provisional pairings such that the second set of provisional pairings do not include coordinates from the first provisional pairing.

6. The method of claim 1, further comprising:
validating a third provisional pairing, the third provisional pairing included in the second set of provisional pairings;
identifying a gesture in response to validating the first provisional pairing and validating the third provisional pairing.

7. A system comprising:
a substrate;
a touch sensor disposed underneath the substrate, the touch sensor comprising a plurality of electrodes;
one or more circuits configured to:
determine a first set of provisional pairings, each provisional pairing of the first set of provisional pairings comprising coordinates from a first set of coordinates and coordinates from a second set of coordinates, the first set of coordinates and the second set of coordinates corresponding to a plurality of touches detected by the touch sensor;
calculate a plurality of distances, each distance corresponding to a provisional pairing, of the first set of provisional pairings;
validate a first provisional pairing of the first set of provisional pairings based on calculating the plurality of distances, the first provisional pairing comprising a first coordinate of the second set of coordinates;
determine that a second provisional pairing of the first set of provisional pairings is not valid in response to determining that:
the second provisional pairing comprises the same first coordinate as the first provisional pairing; and
the first provisional pairing has been validated; and
in response to determining that the second provisional pairing of the first set of provisional pairings is not valid, determine a second set of provisional pairings, each provisional pairing of the second set of provisional pairings comprising coordinates from the first set of coordinates and coordinates from the second set of coordinates.

8. The system of claim 7, wherein the one or more circuits are configured to validate the first provisional pairing by determining that a distance of the plurality of distances associated with the coordinates comprised by the first provisional pairing is less than a threshold.

9. The system of claim 7, wherein the first set of coordinates correspond to a first time frame and the second set of coordinates correspond to a second time frame, the second time frame occurring after the first time frame.

10. The system of claim 7, wherein each of the one or more circuits comprises one or more of the following:
a processor; and
a controller.

11. The system of claim 7, wherein the one or more circuits are configured to determine the second set of provisional pairings such that the second set of provisional pairings do not include coordinates from the first provisional pairing.

12. The system of claim 7:
wherein the one or more circuits are further configured to validate a third provisional pairing, the third provisional pairing included in the second set of provisional pairings; and
further comprising a processor configured to identify a gesture in response to the one or more circuits validating the first provisional pairing and validating the third provisional pairing.

13. One or more circuits configured to:
determine a first set of provisional pairings, each provisional pairing of the first set of provisional pairings comprising coordinates from a first set of coordinates and coordinates from a second set of coordinates, the first set of coordinates and the second set of coordinates corresponding to a plurality of touches detected by a touch sensor;
calculate a plurality of distances, each distance corresponding to a provisional pairing of the first set of provisional pairings;
validate a first provisional pairing of the first set of provisional pairings based on calculating the plurality of distances, the first provisional pairing comprising a first coordinate of the second set of coordinates;
determine that a second provisional pairing of the first set of provisional pairings is not valid in response to determining that:
the second provisional pairing comprises the same first coordinate as the first provisional pairing; and
the first provisional pairing has been validated; and
in response to determining that the second provisional pairing of the first set of provisional pairings is not valid, determine a second set of provisional pairings, each provisional pairing of the second set of provisional pairings comprising coordinates from the first set of coordinates and coordinates from the second set of coordinates.

14. The one or more circuits of claim 13, wherein the one or more circuits are configured to validate the first provisional pairing by determining that a distance of the plurality of distances associated with the coordinates comprised by the first provisional pairing is less than a threshold.

15. The one or more circuits of claim 13, wherein the first set of coordinates correspond to a first time frame and the second set of coordinates correspond to a second time frame, the second time frame occurring after the first time frame.

16. The one or more circuits of claim 13, wherein the one or more circuits are configured to determine second set of provisional pairings such that the second set of provisional pairings do not include coordinates from the first provisional pairing.

17. The one or more circuits of claim 13, wherein the one or more circuits are further configured to:
validate a third provisional pairing, the third provisional pairing included in the second set of provisional pairings; and
identify a gesture in response to validating the first provisional pairing and validating the third provisional pairing.

* * * * *